(12) United States Patent
Jin et al.

(10) Patent No.: US 8,972,847 B2
(45) Date of Patent: Mar. 3, 2015

(54) APPARATUS AND METHOD FOR PROVIDING PICTURES ACCORDING TO SHARING LEVELS

(75) Inventors: Young-kyu Jin, Seoul (KR); Jong-woo Jung, Seoul (KR); Joo-kyung Woo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 897 days.

(21) Appl. No.: 12/699,144

(22) Filed: Feb. 3, 2010

(65) Prior Publication Data

US 2010/0251109 A1    Sep. 30, 2010

(30) Foreign Application Priority Data

Mar. 26, 2009   (KR) .................. 10-2009-0025905

(51) Int. Cl.
| G06F 17/30 | (2006.01) |
| H04N 1/44 | (2006.01) |
| H04N 1/00 | (2006.01) |
| H04N 21/4788 | (2011.01) |
| H04N 21/81 | (2011.01) |

(52) U.S. Cl.
CPC ......... *H04N 1/4406* (2013.01); *H04N 1/00153* (2013.01); *H04N 1/00156* (2013.01); *H04N 1/444* (2013.01); *H04N 21/4788* (2013.01); *H04N 21/8153* (2013.01); *H04N 1/00132* (2013.01); *H04N 1/448* (2013.01); *H04N 2201/3205* (2013.01); *H04N 2201/3214* (2013.01); *H04N 2201/3215* (2013.01); *H04N 2201/3252* (2013.01); *H04N 2201/3274* (2013.01)
USPC ............................ 715/229; 715/201; 715/204

(58) Field of Classification Search
CPC ..... G06F 12/14; G06F 17/00; G06F 17/30029; G06F 17/30244; G06F 17/3089
USPC .......... 715/200, 201, 203, 204, 229, 243, 244
See application file for complete search history.

(56) References Cited

U.S. PATENT DOCUMENTS 6,818,365 B2 * 11/2004 Barber ........................ 430/30
7,991,853 B2   8/2011 Miyoshi et al.
(Continued)

FOREIGN PATENT DOCUMENTS

| JP | 2002-298122 | 10/2002 |
| JP | 2003-264543 | 9/2003 |

(Continued)

OTHER PUBLICATIONS

Korean Office Action issued on Sep. 30, 2014 in corresponding Korean Application No. 10-2009-0025905 (8 pages, with English translation).

*Primary Examiner* — Stephen Hong
*Assistant Examiner* — Gregory J Vaughn
(74) *Attorney, Agent, or Firm* — NSIP Law

(57) ABSTRACT

A picture sharing apparatus and method are provided. The picture sharing apparatus includes technology for providing pictures differentiated according to sharing levels. The picture sharing technology may receive a picture request from a user's terminal and determine that user's sharing level and provide a picture differentiated in a predetermined form according to the user's sharing level. The picture sharing technology fulfills the two conflicting tasks of privacy protection and picture sharing.

20 Claims, 10 Drawing Sheets

(56) References Cited

U.S. PATENT DOCUMENTS

| | | | |
|---|---|---|---|
| 8,150,821 B2* | 4/2012 | Meinsen | 707/705 |
| 2004/0096759 A1* | 5/2004 | Barber | 430/22 |
| 2006/0120618 A1* | 6/2006 | Mizoguchi | 382/255 |
| 2008/0016581 A1* | 1/2008 | Cho et al. | 726/27 |
| 2008/0228499 A1* | 9/2008 | Oh et al. | 704/500 |
| 2008/0288499 A1 | 11/2008 | Choi et al. | |
| 2009/0041294 A1* | 2/2009 | Newell et al. | 382/100 |
| 2009/0177705 A1* | 7/2009 | Meinsen | 707/200 |
| 2010/0179816 A1* | 7/2010 | Wu et al. | 705/1.1 |

FOREIGN PATENT DOCUMENTS

| | | |
|---|---|---|
| KR | 10-2006-0030631 | 4/2006 |
| KR | 10-0650680 B1 | 11/2006 |
| KR | 10-0783328 | 8/2007 |
| KR | 10-0874337 | 10/2007 |
| KR | 10-0785070 | 12/2007 |
| KR | 10-0785617 B1 | 12/2007 |
| KR | 10-2008-0092270 A | 10/2008 |

\* cited by examiner

FIG.1

SETTINGS OF PERSONAL INFORMATION/
SETTINGS OF DISPLAY OF INFORMATION TO OTHER USERS

⊙ NON-VISIBLE (VISIBLE ONLY TO ONESELF)
   ☐ VISIBLE ONLY TO FRIENDS
   ☐ VISIBLE ONLY TO FAMILY
○ VISIBLE (VISIBLE TO ALL)

FIG.8

| SHARING LEVEL | SETTING ITEM |
|---|---|
| 0 | NOT SHARE |
| 1 | THUMBNAIL PICTURE |
| 2 | ADJUST DEFINITION |
| 3 | ORIGINAL PICTURE |
| 4 | METADATA |
| 5 | PROFILE INFORMATION |

APPARATUS AND METHOD FOR PROVIDING PICTURES ACCORDING TO SHARING LEVELS

CROSS-REFERENCE TO RELATED APPLICATION

This application claims the benefit under 35 U.S.C. §119(a) of Korean Patent Application No. 10-2009-0025905, filed on Mar. 26, 2009, in the Korean Intellectual Property Office, the entire disclosure of which is incorporated herein by reference for all purposes.

BACKGROUND

1. Field

The following description relates to a technology for providing pictures, and more particularly, to a technology for providing pictures differentiated according to sharing levels.

2. Description of the Related Art

Recently, it has become desirable and popular to share still or motion pictures between people. Methods of sharing pictures include, for example, directly transferring pictures which are printed on photographic paper or the like, transfer of digital images which are stored in storage media, sharing pictures through online services, such as FLICKR®, PICASA®, and the like, and sharing pictures through e-mail or a Multimedia Messaging Service (MMS).

Pictures often contain personal information, thus, most sites that allow sharing of pictures also allow the user to control access to pictures according to user classifications. For example, in the case of FLICKR®, as shown in FIG. 1, access to each picture is controlled such that the picture is non-visible, visible only to friends, visible only to family, or visible to all. Other services also have settings similar to this.

However, in the example above pictures are shared through establishment of acquaintance relationships (such as "friend" relationships etc). Thus, pictures are either completely shared or not shared at all, according to the results of user authentication.

SUMMARY

In one general aspect, there is provided a picture sharing apparatus for providing pictures differentiated according to sharing levels, the apparatus comprising a storage unit to store pictures, a level determination unit to determine a sharing level of a user, in response to receiving a picture request from the user's terminal, a differentiation unit to differentiate a picture stored in the storage unit, according to the user's sharing level, and a picture provider to provide the differentiated picture to the user's terminal.

The differentiation unit may determine a differentiation degree of the picture according to a setting corresponding to the user's sharing level from among a plurality of settings subjected to the same differentiation method.

The differentiation unit may select at least one setting corresponding to the user's sharing level from among a plurality of setting items subjected to different differentiation methods, and differentiates the picture according to the selected setting.

The differentiation unit may differentiate a definition of the picture, according to the user's sharing level.

The differentiation unit may recognize a region showing a person on the picture and differentiates a definition of the region showing the person, according to the user's sharing level.

The differentiation unit may differentiate a definition of the picture, according to a size of the recognized region showing the person.

The differentiation unit may differentiate a resolution of the picture, according to the user's sharing level.

The differentiation unit may differentiate a cropped portion of the picture, according to the user's sharing level.

The differentiation unit may determine whether or not to show metadata of the picture, according to the user's sharing level.

The differentiation unit may differentiate a display duration of the picture, according to the user's sharing level.

The differentiation unit may differentiate outputs of images and sound included in the picture, according to the user's sharing level.

The plurality of settings subjected to the different differentiation methods may include at least one of information on whether or not to share pictures, picture sizes, definitions of pictures, whether or not to show metadata of pictures, and whether or not to show information on persons included in pictures.

The picture sharing apparatus may further comprise a differentiation information setting unit to set differentiation information according to the sharing levels and store the differentiation information corresponding to the sharing levels.

The differentiation unit may differentiate the picture according to the user's sharing level, with reference to the differential information which is set according to the sharing levels.

The picture sharing apparatus may further comprise a level setting unit to set sharing levels for respective users and store information about the sharing levels for the respective users.

In another aspect, there is provided a picture sharing apparatus for providing pictures differentiated according to sharing levels, the apparatus comprising a storage unit to store pictures differentiated according to sharing levels, a differentiation unit to differentiate a picture at each of the sharing levels and store the differentiated pictures in the storage unit, a level determination unit to determine a sharing level of a user, in response to a picture request from the user's terminal, and a picture provider to read data of a differentiated picture corresponding to the requested picture from the storage unit, and provide the differentiated picture to the user's terminal according to the user's sharing level.

In another aspect, there is provided a picture sharing method of providing pictures differentiated according to sharing levels, the method comprising determining a sharing level of a user requesting a picture, in response to a picture request from the user's terminal, differentiating a picture according to the user's sharing level, and providing the differentiated picture to the user terminal.

The differentiating of the picture according to the sharing levels may comprise determining a differentiation degree of the picture according to a setting corresponding to the user's sharing level from among a plurality of settings subjected to the same differentiation method.

The differentiating of the picture according to the sharing levels may comprise selecting at least one setting corresponding to the user's sharing level from among a plurality of settings subjected to different differentiation methods, and differentiating the picture according to the selected setting.

In another aspect, there is provided a picture sharing method of providing pictures differentiated according to sharing levels, the method comprising differentiating a picture according to the sharing levels and storing the differentiated pictures, determining a sharing level of a user requesting a picture, in response to a picture request from the user's terminal, and reading data of a differentiated picture corresponding to the requested picture from among the stored, differentiated pictures, and providing the differentiated picture to the user's terminal according to the user's sharing level.

Other features and aspects will be apparent from the following detailed description, the drawings, and the claims.

BRIEF DESCRIPTION OF THE DRAWINGS

FIG. 1 is a diagram illustrating a conventional example of setting up authority for viewing pictures according to user levels.

FIG. 8 is an example of differentiation information.

Figure 2:
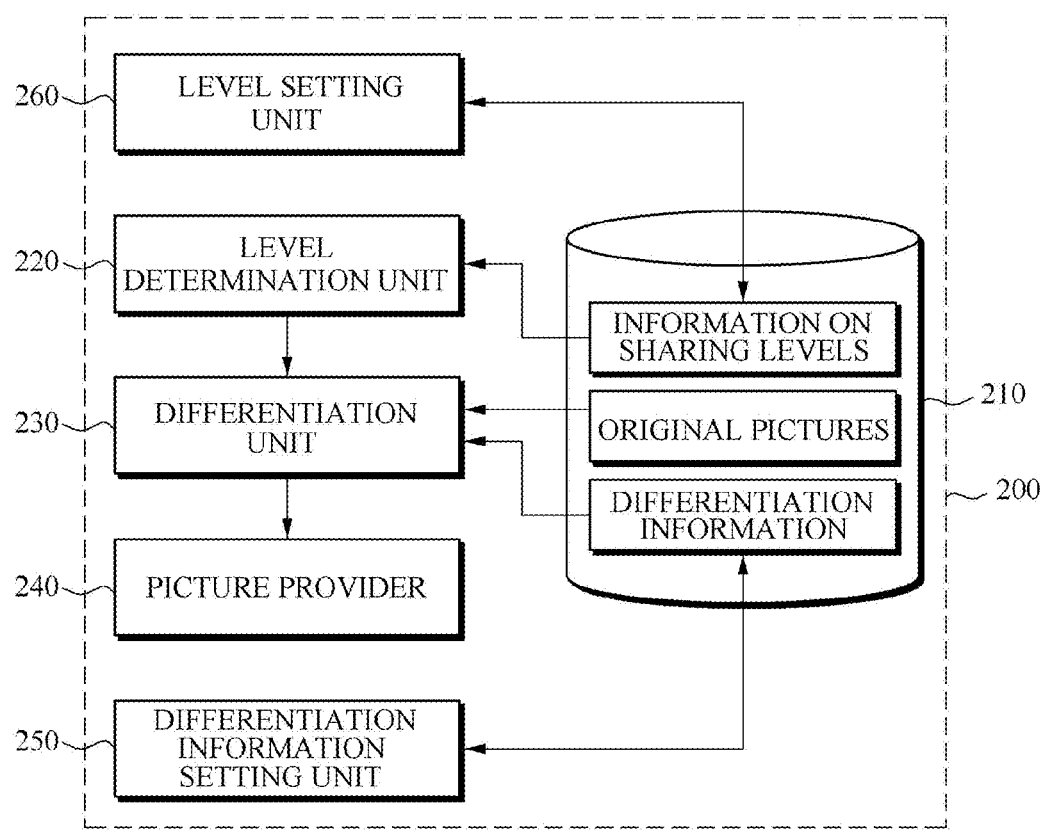
FIG. 2 is a diagram illustrating an example of a picture sharing apparatus for providing pictures differentiated according to sharing levels.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

A picture sharing apparatus which provides pictures differentiated according to sharing levels may be used to share still or motion pictures photographed or recorded by a terminal. The terminal may be, for example, a mobile phone, a digital camera, a digital camcorder, a scanner, and the like, capable of capturing and recording images. The picture sharing apparatus may be implemented in the form of hardware, software, or a combination thereof, and may be installed in a web server or a client device that stores still or motion pictures and may share the stored still or motion pictures.

The picture sharing apparatus may be implemented through various methods. For example, the picture sharing apparatus may differentiate a picture according to a user's sharing level and/or a user terminal's sharing level, in real time, upon receiving a picture request from the user terminal. The picture sharing apparatus may provide the differentiated picture to the user's terminal. This method will be described in detail with reference to FIG. 2.

In some embodiments, the picture sharing apparatus may differentiate a first picture according to a user's sharing level, in advance, and store a series of differentiated pictures related to the first picture. The picture sharing apparatus may read data of a pre-stored differentiated picture corresponding to a user sharing level upon receiving a request from the user terminal. The picture sharing apparatus may provide the first picture and/or the related pictures to the user terminal. This method will be described in detail with reference to FIG. 3.

As described herein, a picture may refer to a static image, a motion picture image, a photographic image, a digital image, a combination thereof, and the like.

FIG. 2 illustrates an example of a picture sharing apparatus 200 for providing pictures differentiated according to sharing levels. As illustrated in FIG. 2, the picture sharing apparatus 200 includes a storage unit 210, a level determination unit 220, a differentiation unit 230 and a picture provider 240.

The storage unit 210 stores pictures. The pictures include, for example, still or motion pictures photographed or recorded by a terminal, such as a mobile phone, a digital camera, a digital camcorder, a scanner, and the like, capable of capturing or recording images.

If the picture sharing apparatus 200 is installed in a web server (not shown), pictures may be uploaded to the web server from a terminal such as a mobile phone, a digital camera, a digital camcorder, a scanner, and the like, that have networking capabilities. The pictures may also be stored in the storage unit 210. Pictures may be uploaded to the web server from a client device such as a PC that has networking capabilities.

If the picture sharing apparatus 200 is installed in a client device, pictures stored in the storage unit 210 may be copied and sent between the picture sharing apparatus 200 and another terminal, by connecting the terminal to the client device.

When a user sends a picture request to the pictures sharing apparatus 200, the level determination unit 220 determines a sharing level of the user making the request. A user of the picture sharing apparatus 200 who wants to share his or her pictures may manually set the sharing levels of the other users. In some embodiments, when the sharing levels of a picture requesting user have not been set, the sharing levels may be automatically designated to the highest restricted sharing level. The setting of sharing levels will be described in more detail below.

A user terminal that wants to see the shared pictures stored or record by another terminal may access the picture sharing apparatus 200 through his or her user terminal (not shown) to request a desired picture. In some embodiments, access to the picture sharing apparatus 200 may be allowed through a membership service.

In response to a request from the terminal of the person wanting to view the sharing pictures of the other person, the picture sharing apparatus 200 determines a sharing level of the requesting user through the level determination unit 220. The sharing level may be based upon user information, user terminal information, or a combination thereof.

For example, the level determination unit 220 may determine a sharing level of a user that has requested to view a picture, based upon sharing level information that has been set by the user that is in control of the picture sharing apparatus 200, and thus in control of the sharing level of the picture.

The differentiation unit 230 differentiates pictures stored in the storage unit 210 according to the user's sharing level determined by the level determination unit 220. The differentiation by the differentiation unit 230 will be described in detail later.

The picture provider 240 provides the differentiated pictures to the requesting user terminal. For example, for pictures that are differentiated in real time by the differentiation unit 230 according to the sharing level of the user, the picture sharing apparatus 200 may provide the differentiated picture to the user terminal through the picture provider 240.

In this example illustrated in FIG. 2, the picture sharing apparatus 200 differentiates pictures in real time according to the sharing levels of users to create differentiated pictures, and provides the users with the differentiated pictures.

Figure 3:
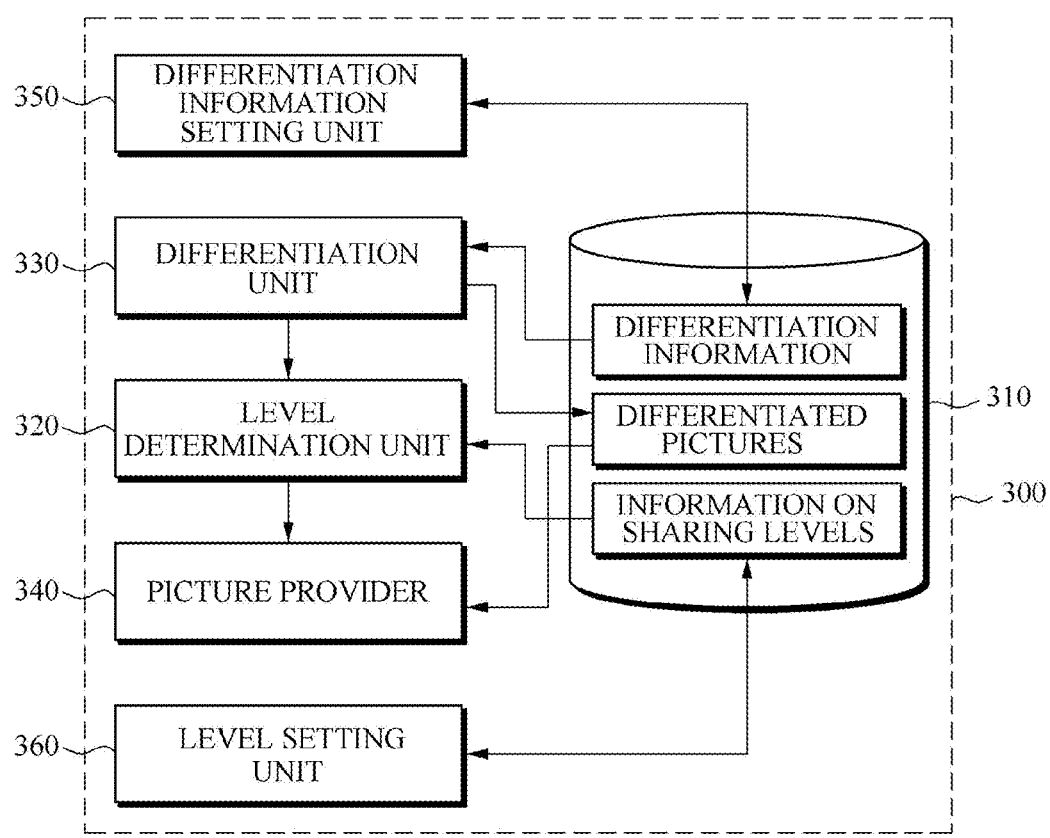
FIG. 3 is a diagram illustrating an example of a picture sharing apparatus for providing pictures differentiated according to sharing levels.

FIG. 3 illustrates an example of a picture sharing apparatus 300 for providing pictures differentiated according to sharing levels. Referring to FIG. 3, the picture sharing apparatus 300 includes a storage unit 310, a differentiation unit 330, a sharing level determination unit 320, and a picture provider 340.

The storage unit 310 stores pictures differentiated according to sharing levels. The term differentiated pictures means pictures differentiated by the picture sharing apparatus 300 in advance before storing.

The differentiation unit 330 differentiates pictures according to sharing levels, and stores the differentiated pictures in the storage unit 310. The differentiation by the differentiation unit 330 will be described in detail later.

If the picture sharing apparatus 300 is installed in a web server (not shown), pictures may be uploaded to the web server from a terminal such as a mobile phone, a digital camera, a digital camcorder, a scanner, and the like, that have networking capabilities. The picture sharing apparatus 300 may differentiate the pictures using the differentiation unit 330. In the case of a terminal such as a mobile phone that does not have networking capabilities, pictures may be uploaded from a client device such as a PC that has networking capabilities to the web server, and then differentiated by the differentiation unit 330.

If the picture sharing apparatus 300 is installed in a client device, a terminal such as a mobile phone, a digital camera, a digital camcorder, a scanner, or the like, may be connected to the client device, and pictures may be copied from the terminal to the client device and then differentiated by the differentiation unit 330.

The sharing level determination unit 320 determines a sharing level of a user who has requested a picture, in response to a picture request from the user terminal. A user in control of picture sharing apparatus 300 may set the sharing levels for other users in advance. The sharing levels of users whose sharing levels have not been may be automatically designated to the highest restricted sharing level by the sharing level determination unit 320. Settings of sharing levels will be described in more detail below.

A user who wants to view the sharing pictures of another user may access the picture sharing apparatus 300 through his or her user terminal (not shown) to request a desired picture. The access to the picture sharing apparatus 300 may be allowed through a membership service.

In response to a request from the terminal of a user wanting to view the sharing pictures of the user of the picture sharing apparatus 300, the picture sharing apparatus 300 determines a sharing level of the requesting user through the sharing level determination unit 320.

For example, the sharing level determination unit 320 may determine a sharing level of a user that has requested to view a picture, with reference to sharing level information set by the user in control of the picture sharing apparatus 300.

The picture provider 340 reads data of a differentiated picture corresponding to the determined sharing level of the user from the storage unit 310, and provides the differentiated picture to the user terminal that requested the shared picture.

For example, after the sharing level of the user is determined by the sharing level determination unit 320, the picture sharing apparatus 300 may cause the picture provider 340 to read the data of a differentiated picture corresponding to the determined sharing level of the user from the storage unit 310, and provide the differentiated picture to the user terminal that has requested to view the picture.

The picture sharing apparatus 300 stores pictures differentiated according to the sharing levels of users. In response to a picture request from a user terminal, the picture sharing apparatus 300 reads data of a corresponding picture from the stored, differentiated pictures, and provides the picture to the user terminal.

According to another example, the differentiation units 230 and 330 may be configured to determine a differentiation degree of pictures according to a setting item corresponding to a sharing level, among a plurality of setting items subjected to the same differentiation method.

Figure 4:
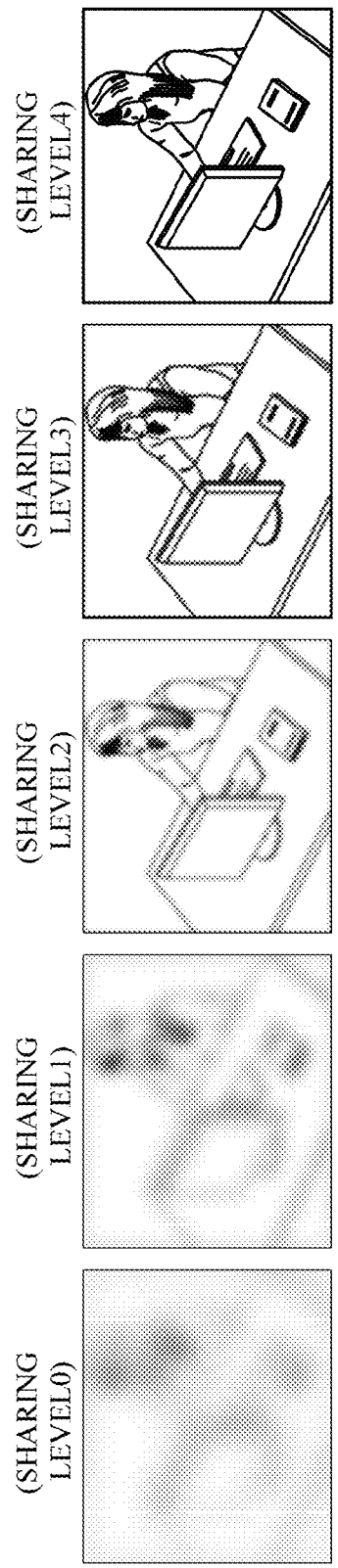
FIG. 4 is an example of providing pictures with different definitions, according to sharing levels.

In the example illustrated in FIG. 4, the differentiation units 230 and 330 may be configured to differentiate the definition of a picture according to a sharing level. Referring to FIGS. 2-4, the differentiation units 230 and 330 differentiate the definition of a picture by blurring the picture according to sharing levels.

The picture sharing apparatuses 200 and 300 may include a range of sharing levels, for example, 3 levels, 5 levels, 8 levels, 12 levels, or other desired amount of levels. In the example of FIG. 4, the sharing levels increase from level 0 to level 4. As the sharing levels increase from level 0 to level 4, the definition/clarity of the image increases. Accordingly, a user with a higher sharing level may view a picture with a higher definition. By differentiating the definition of a picture in this manner, the two conflicting tasks of privacy protection and picture sharing may be fulfilled.

For example, the differentiation units 230 and 330 may recognize a region showing people in a picture, and differentiate a definition of the recognized region according to a sharing level. For example, the recognition of a person region may be possible by extracting the feature points (eyes, nose, lip, etc.) of a character in the picture. Technologies for character region recognition are well known in the related field, thus, a detailed description will be omitted. In this example, only a person region has the definition differentiated, as opposed to differentiating the whole picture.

In some embodiments, the differentiation units 230 and 330 may differentiate a definition of each picture according to the size of the recognized person region. For example the differentiation units 230 and 330 may differentiate a definition of each picture according to the size of a person region included in the picture. For example, the larger the size of a person region included in the picture, the lower the quality of the definition, and the smaller the size of a person region included in an picture is, the higher the quality of the definition. Thus, blur levels may be differentiated for individual pictures.

Figure 5:
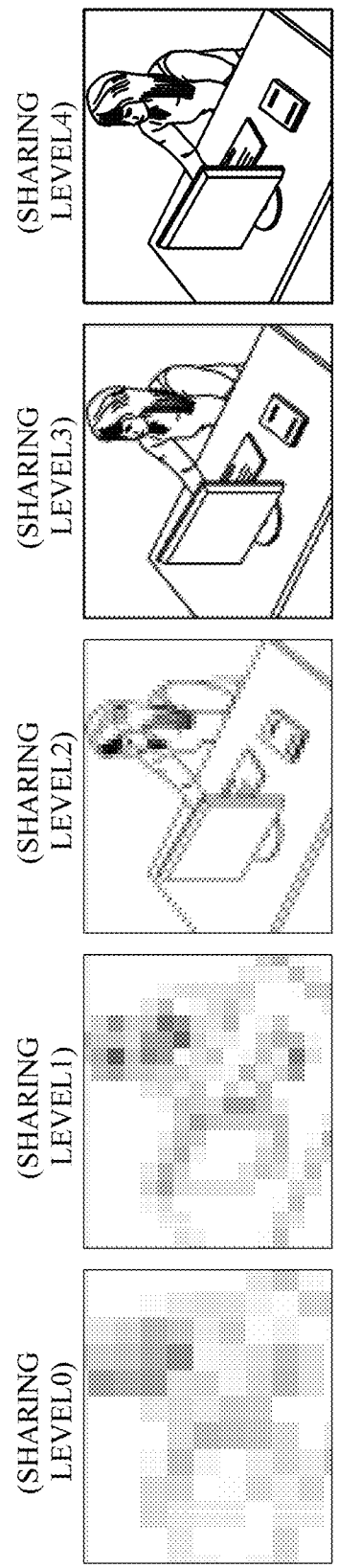
FIG. 5 is an example of providing pictures with different resolutions, according to sharing levels.

In the example illustrated in FIG. 5, the differentiation units 230 and 330 may differentiate the resolution of a picture according to sharing levels. Referring to FIGS. 2, 3, and 5, the differentiation units 230 and 330 may differentiate the resolution of a picture by applying different resolutions to the picture according to sharing levels.

In FIG. 5, as the sharing levels increase, for example, from level 0 to level 4, the resolution of the image becomes higher. Accordingly, a user with a higher sharing level may view a picture with a higher resolution. By differentiating the resolution of a picture in this manner, the two conflicting tasks of privacy protection and picture sharing may be fulfilled.

Figure 6:
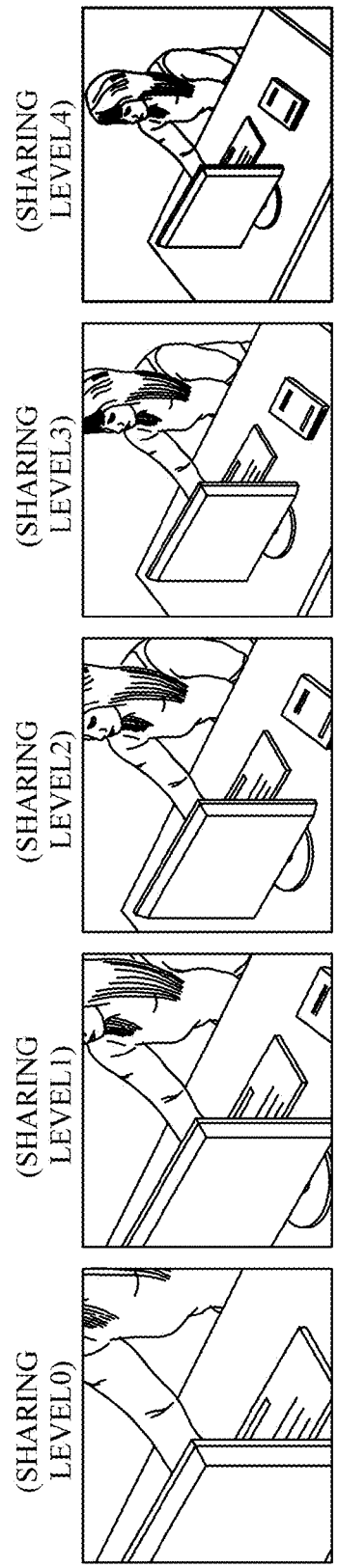
FIG. 6 is an example of providing pictures with different sizes of cropped portions, according to sharing levels.

In the example illustrated in FIG. 6, the differentiation units 230 and 330 may be configured to differentiate a cropped portion of a picture according to sharing levels. Referring to FIGS. 2, 3, and 6, the differentiation units 230 and 330 may differentiate the cropped portion of a picture according to sharing levels.

In the example of FIG. 6, as the sharing levels increase from level 0 to level 4, the size of the cropped portion becomes larger. A user with a higher sharing level can view a picture with a cropped portion of larger size. As such, by differentiating the viewable portion of a picture, the two conflicting tasks of privacy protection and picture sharing may be fulfilled.

The differentiation units 230 and 330 may be configured to determine whether or not to show metadata of a picture, which is not shown in the drawings. Metadata, for example, Exchangeable Image file Format (EXIT), includes various information about the picture, for example, a camera manufacturer, a place where the picture has been captured, a firmware version of the camera, a time at which the picture has been captured, shutter speed, a lens focus distance, an aperture value, an exposure compensation value, and the like.

The differentiation units 230 and 330 may be configured to differentiate the display duration of a picture according to sharing levels. For example, the differentiation units 230 and 330 may differentiate the display duration of a picture according to sharing levels in such a manner that the display duration of the picture is 1 second when the sharing level is "0", 5 seconds when the sharing level is "1", 10 seconds when the sharing level is "2", 30 seconds when the sharing level is "3", and a unlimited time when the sharing level is "4". In this example, the two conflicting tasks of privacy protection and picture sharing may be fulfilled.

The differentiation units 230 and 330 may differentiate the outputs of images and sound included in a motion picture, which is not shown in the drawings. For example, when motion pictures are outputted along with sound, the differentiation units 230 and 330 may differentiate the outputs of pictures and sound included in a motion picture according to sharing levels. For example, the apparatus may output only filtered sound without outputting any images when the sharing level is "0", the apparatus may output only filtered images without outputting any sound when the sharing level is "1", the apparatus output the motion picture and the filtered sound when the sharing level is "2", the apparatus may output the filtered images and sound when the sharing level is "3" and the apparatus may output the motion pictures and sound when the sharing level is "4". In this example, two conflicting requirements of privacy protection and picture sharing may both be fulfilled.

According to another example, the differentiation units 230 and 330 may select at least one setting corresponding to a sharing level, among a plurality of settings subjected to different differentiation methods, and differentiate a picture according to the selected setting.

For purposes of example, the plurality of settings may include whether or not to share pictures, the size of a picture, differentiating the definition of a picture, whether or not to show metadata of the picture, and whether or not to share information of persons included in the picture.

Figure 7:
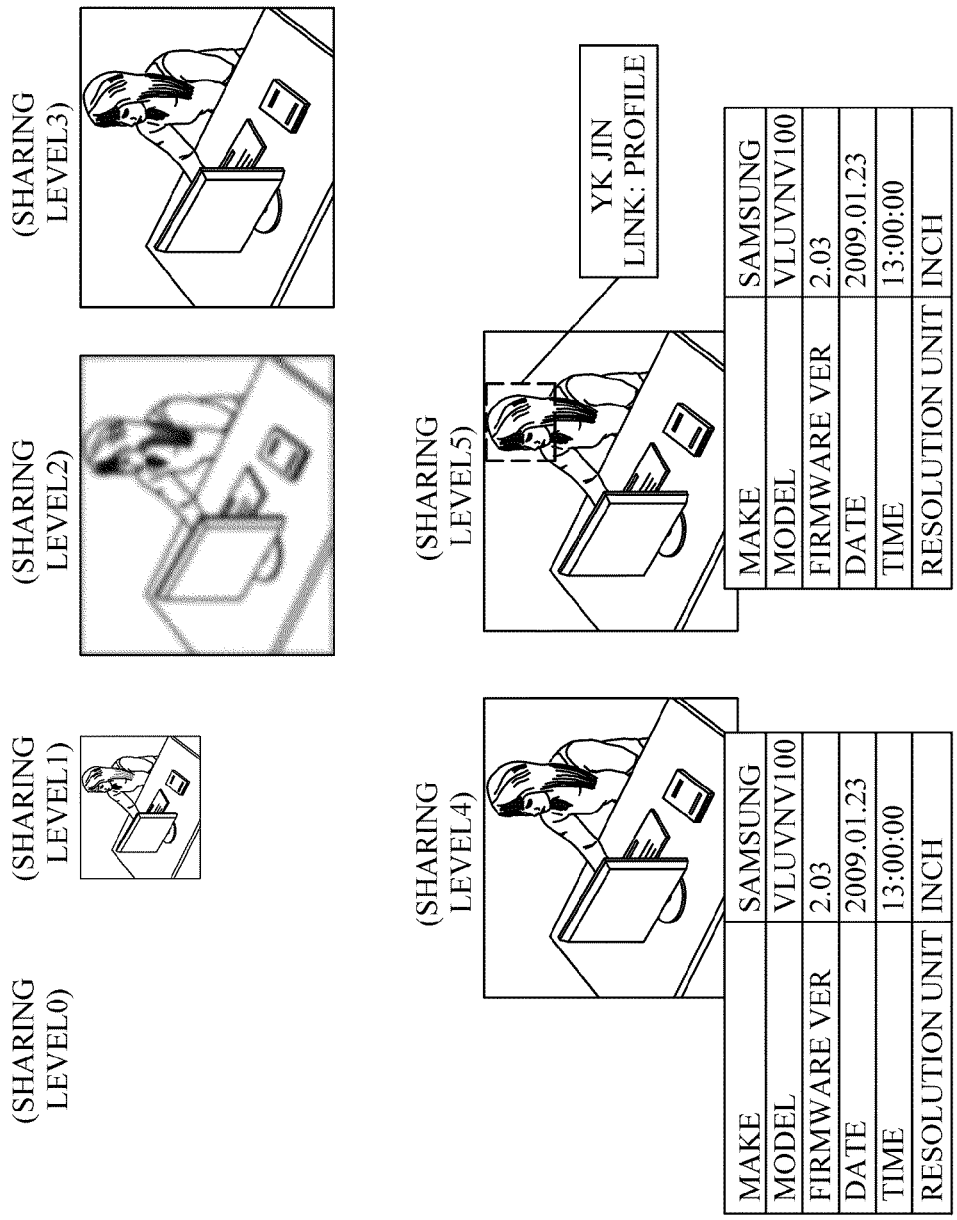
FIG. 7 is an example of applying different differentiation methods, according to sharing levels.

Referring to FIGS. 2, 3, and 7, the differentiation units 230 and 330 may differentiate a picture according to sharing levels. In the example illustrated in FIG. 7, the picture may be differentiated such that the apparatus may not share the corresponding picture when the sharing level is "0", the apparatus may provide the corresponding picture in the form of a thumbnail image when the sharing level is "1", the apparatus may blur the corresponding picture to lower its definition when the sharing level is "2", the apparatus may provide the picture as it is when the sharing level is "3, the apparatus provides the corresponding picture and its metadata (EXIF) when the sharing level is "4" and the apparatus may provide the corresponding picture and its metadata (EXIF) and profile information when the sharing level is "5." Such an apparatus fulfils the two conflicting tasks of privacy protection and picture sharing.

It is to be understood that the picture sharing apparatus is not limited to the above examples, and that any desired sharing levels and amount of information/data shared at each level may be performed by the picture sharing apparatus.

Referring to FIGS. 2 and 3, the picture sharing apparatuses 200 and 300 may further include differentiation information setting units 250 and 350. The differentiation information setting units 250 and 350 set differentiation information according to sharing levels, and store the differentiation information corresponding to the sharing levels.

The differentiation information set by the differentiation information setting units 250 and 350 includes settings for respective sharing levels. For example, when the definition of a picture is differentiated according to sharing levels, settings for each sharing level may be used to select the numbers of Gaussian Blur pixels for each sharing level.

For example, when the resolution of a picture is differentiated for each sharing level, settings for each sharing level may be used to input or select resolution values for each sharing level.

For example, when the cropped portion of a picture is differentiated according to sharing levels, setting for each sharing level may be used to input or select a size of cropped portion for each sharing level.

For example, when metadata of a picture is shown or not shown according to sharing levels, setting for each sharing level may be used to select any one piece of information from among various pieces of information about the picture which is included in the metadata.

For example, when the display duration of a picture is shared according to sharing levels, setting for each sharing level may be used to input or select display durations for each sharing level.

For example, when the outputs of images and sound included in a motion picture are differentiated according to sharing levels, setting for each sharing level may be used to select the outputs of pictures and sound for each sharing level.

FIG. 8 illustrates an example of differentiation information. The differentiation information shown in FIG. 8 may be set to not share a corresponding picture when a sharing level is "0", to provide the corresponding picture in the form of a thumbnail image when the sharing level is "1", to blur the corresponding picture to lower its definition when the sharing level is "2", to provide the picture as it is when the sharing level is "3", to provide the picture and its metadata when the sharing level is "4", and to provide the picture and its profile information when the sharing level is "5".

The examples described herein, and what is shown to a user at each level may be adjusted as desired, and the picture sharing apparatus is not limited to the examples described herein. For example, the same setting item may be set for different sharing levels so that the same differentiation process is applied for the different sharing levels, or other desired sharing changes.

The differentiation units 230 and 330 may perform differentiation on a picture according to a user's sharing level. The differentiation information according to sharing levels may be set by the differentiation information setting units 250 and 350.

The differentiation units 230 and 330 may differentiate a picture according to a user's sharing levels on the basis of the differentiation information which is set by the differentiation information setting units 230 and 330, thereby fulfilling two conflicting tasks of privacy protection and picture sharing.

According to another example, the picture sharing apparatuses 200 and 300 may further include level setting units 260 and 360. The level setting units 260 and 360 set sharing levels of respective users and store information about the sharing levels for respective users.

For example, a user of the picture sharing apparatuses 200 and 300 that desires to share pictures may set sharing levels for respective users in advance. For example, when a picture sharing service is provided through a membership service, a member wanting to share his or her picture may establish an acquaintance relationship with other members.

If the acquaintance relationship is established, the member wanting to share his or her pictures may set sharing levels of the other members according to intimacy levels through the level setting units 260 and 360, as illustrated in FIGS. 2 and 3. The sharing levels of persons whose sharing levels have not been set may be automatically designated to the highest restricted sharing level.

Hereinafter, a method of providing pictures differentiated according to sharing levels in the picture sharing apparatuses 200 and 300 described above will be described with reference to FIGS. 9 and 10.

Figure 9:
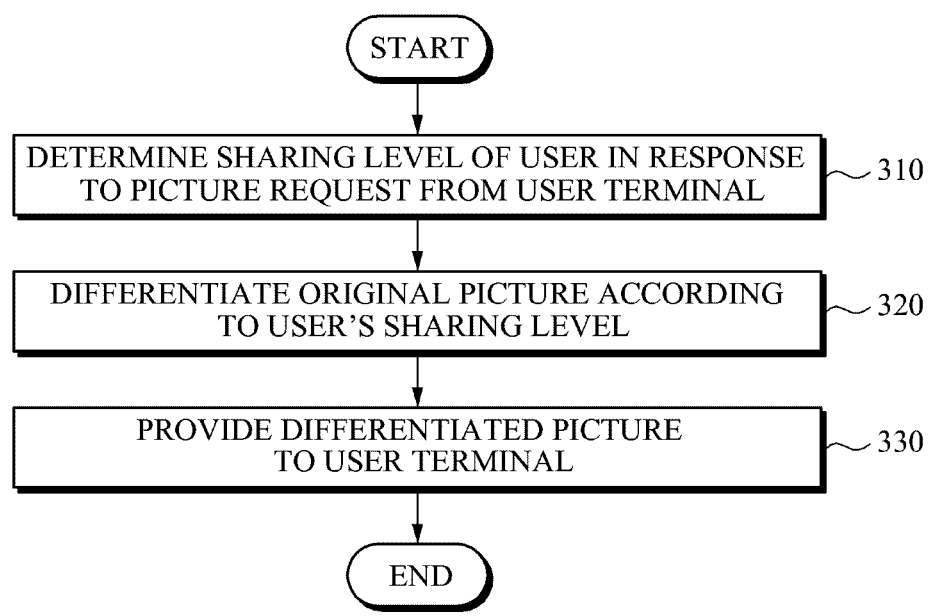
FIG. 9 is a flowchart illustrating an example of a picture sharing method for providing pictures differentiated according to sharing levels.

FIG. 9 illustrates an example of a picture sharing method for providing pictures differentiated according to sharing levels. The picture sharing apparatus (for example, 200 of FIG. 2) may differentiate a picture, in real time, according to sharing level of the user requesting a picture. The picture sharing apparatus may provide the differentiated picture to the requesting user terminal.

In response to a picture request from a user terminal, a sharing level of a corresponding user who requests the picture is determined, in 310. Details related to sharing levels have been given above, thus, a description will be omitted.

A picture requested may be differentiated according to the determined sharing level of the requesting user terminal in 320. In 320, a differentiation degree of the picture may be determined according to a setting item corresponding to the sharing level among a plurality of setting items subjected to the same differentiation method. Details related to this process have been given above, thus, a detailed description will be omitted.

In 320, the picture may be differentiated according to at least one setting item selected in correspondence to the sharing level among a plurality of setting items subjected to different differentiation methods. Details related to this process have also been given above, thus, a description will be omitted.

The differentiated picture may be provided to the user terminal in 330. By providing pictures differentiated in various forms according to users' sharing levels, the apparatus and method fulfils two conflicting tasks of privacy protection and picture sharing.

Figure 10:
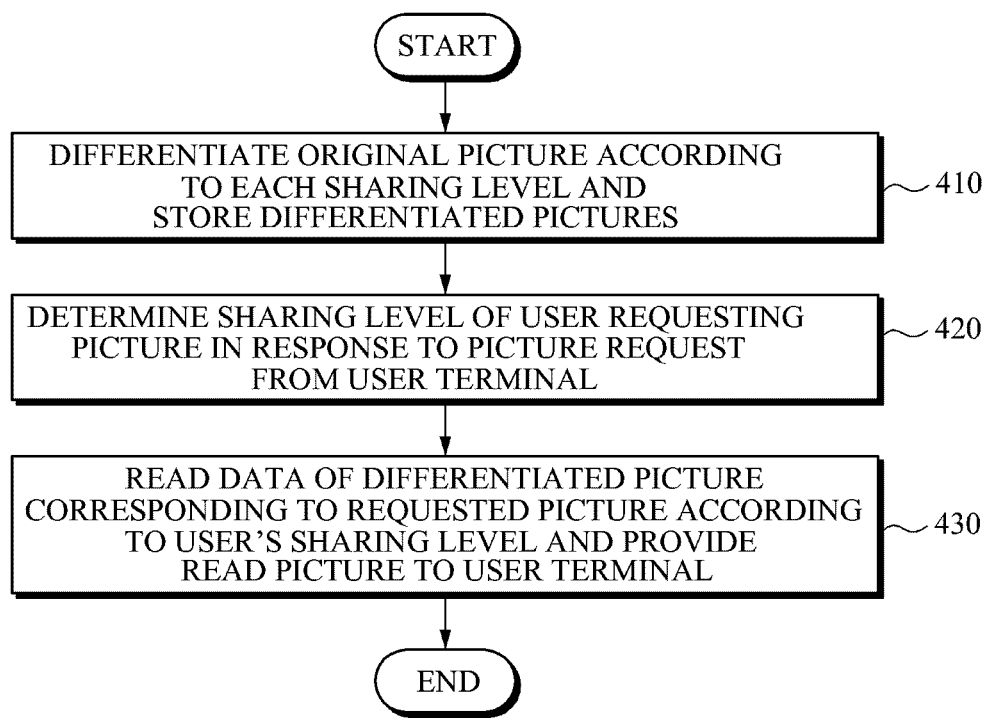
FIG. 10 is a flowchart illustrating an example of a picture sharing method for providing pictures differentiated according to sharing levels.

FIG. 10 illustrates another example of a picture sharing method for providing pictures differentiated according to sharing levels. The picture sharing apparatus (for example, 300 of FIG. 3) may create and store pictures differentiated according to sharing levels in advance. In response to a picture request from a user terminal, the picture sharing apparatus may read data of a pre-stored picture corresponding to a user terminal's sharing level, and provide the read picture to the user terminal.

A picture may be differentiated according to sharing levels and pictures differentiated for the respective sharing levels may be stored in 410.

In 410, a differentiation degree of the picture may be determined according to a setting corresponding to the sharing level among a plurality of setting items subjected to the same differentiation method. Details related to this process have been given above, thus, a description will be omitted.

In some embodiments, in 410, the picture may be differentiated according to at least one setting selected in correspondence to the sharing level among a plurality of setting items subjected to different differentiation methods. Details related to this process have also been given above, thus, a description will be omitted.

A sharing level of a user who requests a picture may be determined in response to a picture request from a user terminal, in 420. Details related to sharing levels have been given above, thus, a detailed description will be omitted.

In 430, a differentiated picture corresponding to the determined sharing level of the user may be read with reference to the stored pictures, and the differentiated picture may be provided to the user terminal.

By providing pictures differentiated in various forms according to picture requesting users' sharing levels, the apparatus fulfils two conflicting tasks of privacy protection and picture sharing.

Described herein are various embodiments of a picture sharing apparatus and method thereof. The picture sharing apparatus allows a user in control of the picture sharing apparatus a measure of security by allowing the user to determine how much picture information and sound information to share with other user terminals. A user may adjust how much information is shared with other user terminals using the picture sharing apparatus.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A picture sharing apparatus for providing pictures differentiated according to sharing levels, the apparatus comprising:
    a storage unit configured to store pictures differentiated according to sharing levels;
    a differentiation unit configured to differentiate a picture at each of the sharing levels into a series of differentiated pictures related to the picture and store the series of differentiated pictures in the storage unit;
    a level determination unit configured to determine a sharing level of a user, in response to a picture request from the terminal of the user; and
    a picture provider configured to read data of a corresponding differentiated picture that relates to the requested picture from the series of differentiated pictures stored in the storage unit, and provide the corresponding differentiated picture to the terminal of the user according to the sharing level of the user.

2. The picture sharing apparatus of claim 1, wherein the differentiation unit determines a differentiation degree of the picture according to a setting corresponding to the sharing level of the user from among a plurality of settings subjected to the same differentiation method.

3. The picture sharing apparatus of claim 2, wherein the differentiation unit differentiates a definition of the picture by the applying of different blur levels according to the sharing level of the user.

4. The picture sharing apparatus of claim 3, wherein the differentiation unit recognizes a region showing a person on the picture and differentiates a definition of the region showing the person, according to the sharing level of the user.

5. The picture sharing apparatus of claim 4, wherein the differentiation unit differentiates a definition of the picture, according to a size of the recognized region showing the person.

6. The picture sharing apparatus of claim 2, wherein the differentiation unit differentiates a resolution of the picture, according to the sharing level of the user.

7. The picture sharing apparatus of claim 2, wherein the differentiation unit differentiates a cropped portion of the picture, according to the sharing level of the user.

8. The picture sharing apparatus of claim 2, wherein the differentiation unit determines whether or not to show metadata of the picture, according to the sharing level of the user.

9. The picture sharing apparatus of claim 2, wherein the differentiation unit differentiates a display duration of the picture, according to the sharing level of the user.

10. The picture sharing apparatus of claim 2, wherein the differentiation unit differentiates outputs of images and sound included in the picture, according to the sharing level of the user.

11. The picture sharing apparatus of claim 1, wherein the differentiation unit selects at least one setting corresponding to the sharing level of the user from among a plurality of setting items subjected to different differentiation methods, and differentiates the picture according to the selected setting.

12. The picture sharing apparatus of claim 11, wherein the plurality of settings subjected to the different differentiation methods includes at least one of information on whether or not to share pictures, picture sizes, definitions of pictures, whether or not to show metadata of pictures, and whether or not to show information on persons included in pictures.

13. The picture sharing apparatus of claim 1, further comprising a differentiation information setting unit to set differentiation information according to the sharing levels and store the differentiation information corresponding to the sharing levels.

14. The picture sharing apparatus of claim 13, wherein the differentiation unit differentiates the picture according to the sharing level of the user, with reference to the differential information which is set according to the sharing levels.

15. The picture sharing apparatus of claim 1, further comprising a level setting unit to set sharing levels for respective users and store information about the sharing levels for the respective users.

16. The picture sharing apparatus of claim 1, wherein the differentiation unit is configured to apply different blur levels to the picture to differentiate the picture into the series of differentiated pictures and to store the series of differentiated pictures.

17. A picture sharing method of providing pictures differentiated according to sharing levels, the method comprising:
    differentiating a picture according to the sharing levels into a series of differentiated pictures related to the picture and storing the series of differentiated pictures;
    determining a sharing level of a user requesting a picture, in response to a picture request from the terminal of the user; and
    reading data of a corresponding differentiated picture related to the requested picture from among the stored series of differentiated pictures, and providing the corresponding differentiated picture to the terminal of the user according to the sharing level of the user.

18. The picture sharing method of claim 17, wherein the differentiating of the picture according to the sharing levels comprises determining a differentiation degree of the picture according to a setting corresponding to the sharing level of the user from among a plurality of settings subjected to the same differentiation method.

19. The picture sharing method of claim 17, wherein the differentiating of the picture according to the sharing levels comprises selecting at least one setting corresponding to the sharing level of the user from among a plurality of settings subjected to different differentiation methods, and differentiating the picture according to the selected setting.

20. The picture sharing method of claim 17, wherein the differentiating of the picture involves applying different blur levels to the picture and storing the series of differentiated pictures.

* * * * *